Nov. 20, 1951       J. M. WOLF       2,576,060
RADIO-FREQUENCY CALORIMETER WATTMETER
Filed Aug. 8, 1945
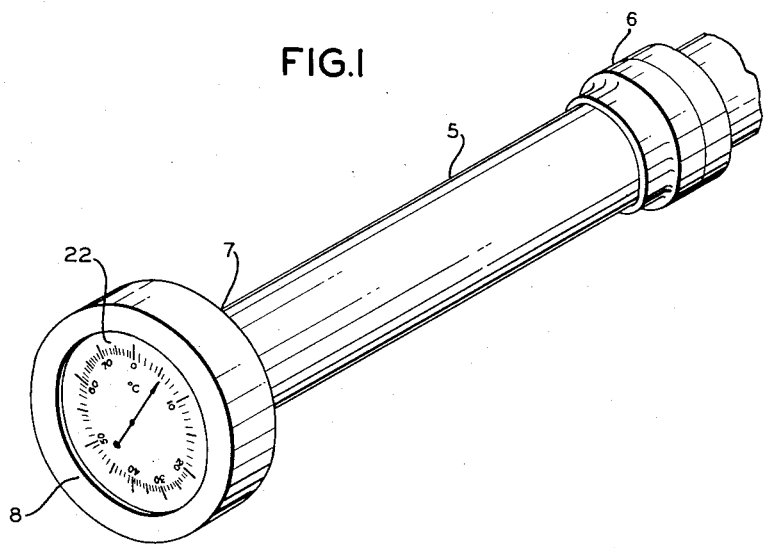
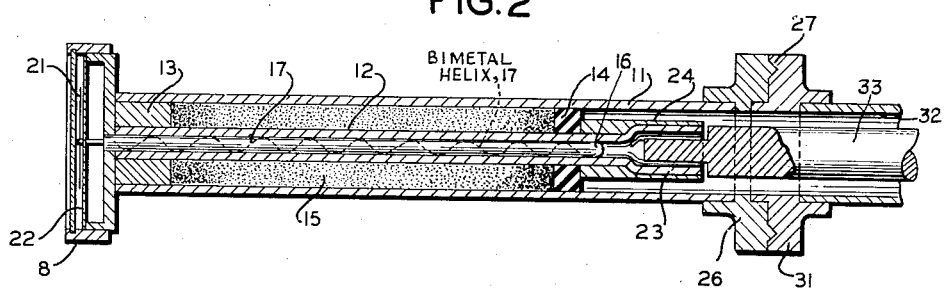
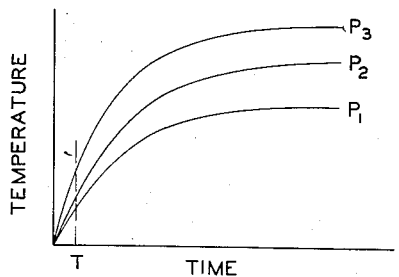
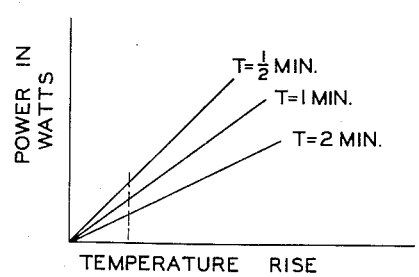
INVENTOR
JAMES M. WOLF
BY
ATTORNEY Patented Nov. 20, 1951

2,576,060

UNITED STATES PATENT OFFICE 2,576,060

RADIO-FREQUENCY CALORIMETER WATTMETER

James M. Wolf, Boston, Mass., assignor, by mesne assignments, to the United States of America as represented by the Secretary of the Navy Application August 8, 1945, Serial No. 609,666

13 Claims. (Cl. 171—95)

My invention relates in general to the field of ultra high radio frequency power measurement and more specifically concerns a novel calorimeter type wattmeter.

The problem of measurement of power output of ultra high frequency generators is essentially that of absorbing the generated energy in a suitable load and determining the power from basic calorimeter considerations.

For example, it has heretofore been the practice to use a calorimeter consisting of a stub section having suitable piping connections to permit the circulation therein of a liquid such as water. The calorimeter line section would be carefully matched to the output section of the high frequency generator to obtain maximum power dissipation in the water. In one such embodiment, a thermocouple junction was placed in the water intake line and another junction in the outlet. A differential bridge circuit was used to meter the temperature change in the water resulting from its flow through the high frequency field. Before this temperature difference could be considered representative of true power dissipation, accurate control of the rate of liquid flow and the chemical composition thereof had to be established.

The application of this power output meter has therefore been limited by the complex nature of the required liquid circulation and control systems, the lack of sensitivity and the length of time required for the stabilization of temperatures. This equipment could not be classed as portable.

My invention contemplates an ultra high frequency calorimeter wattmeter of portable, simplified mechanical construction, which is readily coupled to coaxial and wave guide transmission systems for measurement of power output. Physically, this wattmeter consists of a dry dissipative load material positioned between the concentric conductors of a coaxial stub. The stub conductor diameters are such that a proper impedance match is obtained between load and line and substantially the total power output of the high frequency generator is converted into heat. It has been determined by experiment and substantiated mathematically, that the temperature rise in a semi-conductive material over a small fixed period of time, is directly proportional to the power input, provided that the temperature change is large. Based upon this principle, I obtain a measure of the total power by inserting a thermal sensitive element, as for example, a dial type thermometer, into the coaxial stub to measure the temperature change, a fixed short time being used for all measurements. The coaxial construction of the wattmeter permits the application thereof to corresponding coaxial systems operating over a wide band of frequencies, and further, application to wave guide transmission systems.

It is therefore an object of my invention to provide a portable dry calorimeter wattmeter for rapidly measuring power output in ultra high frequency systems.

Another object of my invention is to provide a high frequency dry calorimeter wattmeter, capable of dissipating the output of a high frequency power source and rapidly developing a large temperature change, metered upon a conveniently disposed thermometer.

A further object of my invention is to provide a calorimeter type of high frequency power output meter of coaxial stub construction which may be coupled to wave guide or coaxial power sources and which measures power output by an indication of temperature change in a dry semi-conductive composition.

These and other objects of my invention will now become apparent from the following specification taken in connection with the accompanying drawings in which:

Fig. 1 is a perspective view showing the general external appearance of the calorimeter wattmeter;

Fig. 2 is a cross sectional view of the coaxial calorimeter illustrated in Fig. 1;

Fig. 3 is a graphical representation of the variations of temperature of a dielectric material as a function of time for fixed values of power input;

Fig. 4 shows representative calibration curves of the power output meter.

Referring now to Fig. 1, there is shown a practical embodiment of the dry calorimeter wattmeter. The structure consists of a stub section 5 of coaxial line having a rapid coupling device 6 attached at the open end thereof. The opposite end 7 of the coaxial stub is metallically short circuited and covered by the circular face of a dial type thermometer 8. The stem of the thermometer 8 extends into the stub section.

As is illustrated in greater detail in the cross sectional view Fig. 2, the stub section comprises a cylindrical outer conductor 11 and concentric hollow conductor 12. This coaxial line section is short circuited at one end by the circular metal plug 13, in firm electrical contact with conductors 11 and 12.

A thin dielectric insulating bead 14 is positioned near an end of the inner conductor 12 and serves to center the conductor 12 and to confine a dry, semi-conductive composition 15 to the space between conductors, as shown.

The dial thermometer 8 is rigidly positioned at the end of the coaxial section so that the stem 16 extends through the bore of the inner conductor 12. A thermometer of this type operates upon the well-known principle of the differential expansion of the elements of a bimetal strip. Thus, a bimetal helix 17 is enclosed by the metal stem 16, and is attached to the pointer 21. A change in temperature in the region of stem 16 causes the helix 17 to develop a torque which rotates the pointer 21 over the calibration card 22, in the thermometer indicator housing as illustrated in Fig. 1.

The end 23 of the inner coaxial conductor is flared, and is fitted with a correspondingly counterbored sleeve 24, in contact at one end with the insulating bead 14.

The open end 25 of the coaxial stub is press fitted with a coupling ring 26 having an integral circular ridge 27 on the face thereof. The coupling ring 26 permits rapid connection to a mating fitting 31 secured to the outer conductor 32 of a coaxial line, which may, for example, extend from a magnetron or other high frequency source. Clearly, any of the well known couplers may be substituted for that shown in Figs. 1 and 2.

When the coaxial stub wattmeter is coupled to a power source, contact between outer conductors is made as shown, and the inner conductor 33 of the source coaxial cable enters the flared opening 23 of inner conductor 12.

The characteristic impedance of the section of stub between the dielectric bead 14 and the open end 25 is determined by the relative diameters of the sleeve 24 and outer conductor 11. Inasmuch as the dielectric changes from air to the semi-conductive electrical load composition 15 within the stub, the diameter of the inner conductor is changed from that of the sleeve 24 to that of the conductor 12 in order that the load section match the transmission section of the line. Since the bead 14 is located on the smaller diameter tube, it is made of a material of approximately the same dielectric constant as the composition 15 to minimize reflections. This construction, which provides matching of the load to the line section permits the operation of the wattmeter over a wide frequency band.

In use, electromagnetic energy flowing from a power source will enter the stub at 25 and pass through the dielectric bead 14 without appreciable reflection or attenuation. This energy will then be rapidly attenuated by dissipation in the composition 15; little if any reaching the shorting plug 13. Energy reflected from the plug 13 will be further attenuated by the composition 15, so that in effect, the wattmeter serves as a substantially perfect absorber and will provide a standing wave ratio near unity in the source transmission system.

The electrical load comprising the composition 15 is preferably a uniform, dry mixture of plain quartz sand and aqua-dag coated sand. By properly proportioning these components of the mixture the desired dissipation or attenuation may be obtained. This mixture is particularly advantageous since it is capable of withstanding an unlimited number of temperature cycles without change in its effective resistance. The characteristics of this load are substantially independent of frequency.

As a result of the novel physical structure, whereby the thermometer stem 16 enters the stub section through the inner metallic conductor 12, transfer of the heat generated in the sand region 15 to the thermometer is greatly enhanced. It is important for high sensitivity that the bore of the inner conductor 12 be of such a diameter that intimate contact with the thermometer stem 16 is maintained over its entire surface.

The dissipation of the entire output of an ultra high frequency generator in the form of heat in the resistive material 15 results in a rapid rise in temperature. Under ideal considerations this temperature would exponentially approach a steady state value as determined by a balance between dissipated energy and natural cooling. The apparatus herein illustrated is best and most accurately operated with a power input giving a high steady state temperature. However, this temperature is never attained in practice since a comparatively short period of time is actually used for measurement. This is illustrated by the curves of temperature as a function of time shown in Fig. 3. For increasing values of power input $P_1$, $P_2$ and $P_3$, correspondingly higher final temperatures are reached. In practice the initial, ambient temperature is recorded and the wattmeter energized. After the short, fixed period of time, T, the temperature is again read. The difference or temperature rise is, for practical purposes, proportional to the power input since these curves are fairly linear in the range considered. Minor variations in ambient temperature will have little effect since the temperature difference during time T is large. Variable heat radiation from the stub tends to change the slope of the temperature-time curve so that errors are minimized when measurements are taken in still air.

A group of calibration curves for this instrument is shown in Fig. 4. Here the time during which power is applied is fixed and the rise in temperature due to a known power input calibrated. These curves are linear because of the small curvature present in the used region of the curves of Fig. 3, and are, for practical purposes, independent of frequency.

In practice, I have found that the power to be measured, in watts, is often of the same order as the temperature rise in degree centigrade. Thus, by proper calibration, the instrument may be made direct reading; a representative calibration tag being: "Temperature Rise in 35 seconds equal Power in Watts." For convenience in determining temperature rise, the thermometer calibration card 22 may be rotatable and reset to zero before each test. The combination of this type of thermometer and the direct reading feature of watts in terms of degrees results in a power output meter which because of its ease of operation and degree of accuracy is readily adaptable to production testing and other routine work.

Although the use of this wattmeter has been discussed only in connection with coaxial power transmission from a source generator, it is readily adaptable to wave guide power transmission systems. For this purpose, the stub wattmeter is coupled to the wave guide through any of the well known adaptors which transfer energy from wave guide to coaxial cable with a minimum of reflection and impedance mismatch.

It is evident that many modifications of the specific embodiment of calorimeter wattmeter treated in this disclosure may become apparent to those skilled in the art. I prefer that the spirit and scope of the invention be limited not by the specific disclosures above, but by the appended claims.

I claim:

1. A radio frequency calorimeter wattmeter comprising a coaxial line section filled in part with dry semi-conductive sand having comparatively high attenuation to radio frequency energy, and a thermometer extending into the inner conductor of said line section for measuring the temperature of said sand.

2. A radio frequency calorimeter wattmeter for ultra high frequency power measurement comprising a coaxial stub section adaptable to coaxial and wave guide transmission systems, a sand load for dissipating radio frequency energy flowing into said coaxial stub section, and a thermometer extending into the inner conductor of said coaxial stub for measuring the temperature of said sand.

3. A radio frequency calorimeter wattmeter for ultra high frequency power measurement comprising a coaxial line section, coupling means for adapting said line section to coaxial and wave guide transmission systems, an electrical load comprising a uniform mixture of plain quartz sand and aqua-dag coated sand positioned within said coaxial line section for absorbing energy flowing into said line section, and a thermometer extending into the inner conductor of said line section for measuring the temperature rise of said sand load.

4. A radio frequency calorimeter wattmeter for ultra high frequency power measurement comprising a coaxial stub section having an outer conductor and a concentric inner conductor, a dry semi-conductive sand load positioned between said stub section conductors for dissipating radio frequency energy flowing into said stub section, a dial type thermometer comprising an indicator housing and a thermal sensitive stem, a bore in said stub section inner conductor, said thermometer stem extending into said stub section through the bore in said inner conductor.

5. A radio frequency calorimeter wattmeter for ultra high frequency power measurement comprising, a stub section of transmission line having concentric inner and outer conductors, said inner conductor having a bore therein, a dry semi-conductive sand load filling the space between said conductors, and a thermometer having a thermal sensitive stem, said thermometer stem extending into said stub section through the bore in said inner conductor.

6. A radio frequency calorimeter wattmeter for ultra high frequency power measurement comprising a stub section of line having inner and outer conductors, a conducting plug short circuiting said line section at one end thereof, a dielectric bead disposed between said inner and outer conductor near the other end of said section, said plug and said bead enclosing a chamber therebetween, a dry semi-conductive sand load filling said chamber, a bore in said stub section inner conductor and a dial type thermometer having a thermal sensitive stem, said stem extending into said stub section through the bore in said inner conductor.

7. A radio frequency wattmeter comprising, a section of coaxial transmission line having inner and outer conductors, said inner conductor having a coaxial bore therein, a dry semi-conductive load filling the space between said conductors, and thermal sensitive means positions in said bore for measuring the temperature rise of said load.

8. A radio frequency wattmeter comprising, a section of coaxial transmission line having inner and outer conductors, a dry semi-conductive sand load filling the space between said conductors, and thermal sensitive means positioned in heat transferring relation with said inner conductor for measuring the temperature rise of said load.

9. A radio frequency wattmeter comprising, a section of coaxial transmission line having inner and outer conductors, a dry semi-conductive sand load filling the space between said conductors, and a thermometer having a thermal sensitive stem, said thermometer stem being positioned in heat transferring relation with said inner conductor for measuring the temperature rise of said load.

10. A radio frequency wattmeter comprising, a section of coaxial transmission line having inner and outer conductors, a load comprising an equal mixture of plain quartz sand and aquadag-coated sand filling the space between said conductors, and thermal sensitive means positioned in heat transferring relation with said inner conductor for measuring the temperature rise of said load.

11. A radio frequency wattmeter comprising, a coaxial line section having inner and outer conductors filled for a portion of its length with a dry semi-conductive material, and a thermal sensitive element positioned in heat transferring relation with said inner conductor for measuring the temperature rise of said material.

12. A radio frequency wattmeter comprising, a coaxial line section having inner and outer conductors filled for a portion of its length with dry semi-conductive material, and a thermal sensitive element extending into said inner conductor for measuring the temperature of said material.

13. A radio frequency wattmeter comprising, a coaxial line section having inner and outer conductors, a conducting plug closing one end of said section, a dielectric bead positioned between said inner and outer conductors near the other end of said section, a dry semi-conductive load filling the space between said plug and said bead for dissipating radio frequency energy flowing into said section, a dial type thermometer comprising an indicator and a thermal sensitive stem, a bore in said inner conductor, said thermometer stem extending into said section from said one end into the bore in said inner conductor.

JAMES M. WOLF.

REFERENCES CITED

The following references are of record in the file of this patent:

UNITED STATES PATENTS

| Number | Name | Date |
|---|---|---|
| 1,905,353 | Potter | Apr. 25, 1933 |
| 1,957,538 | Jensen | May 8, 1934 |
| 2,197,122 | Bowen | Apr. 16, 1940 |
| 2,354,809 | Goldstine | Aug. 1, 1944 |
| 2,387,158 | Kozanowski | Oct. 16, 1945 |
| 2,398,606 | Wang | Apr. 16, 1946 |
| 2,409,599 | Tiley | Oct. 15, 1946 |
| 2,438,915 | Hansen | Apr. 6, 1948 |
| 2,464,277 | Webber | Mar. 15, 1949 |
| 2,497,093 | Moreno | Feb. 14, 1950 |